US008879680B2

(12) United States Patent
Tresidder et al.

(10) Patent No.: US 8,879,680 B2
(45) Date of Patent: Nov. 4, 2014

(54) ADAPTIVE CLOCK MISMATCH COMPENSATION SYMBOL INSERTION IN SIGNAL TRANSMISSIONS

(71) Applicant: ATI Technologies ULC, Markham (CA)

(72) Inventors: Michael Tresidder, Newmarket (CA); Gordon F. Caruk, Brampton (CA)

(73) Assignee: ATI Technologies ULC, Markham (CA)

(\*) Notice: Subject to any disclaimer, the term of this patent is extended or adjusted under 35 U.S.C. 154(b) by 7 days.

(21) Appl. No.: 13/670,062

(22) Filed: Nov. 6, 2012

(65) Prior Publication Data
US 2014/0126612 A1   May 8, 2014

(51) Int. Cl.
*H04L 7/00*   (2006.01)

(52) U.S. Cl.
USPC ........... 375/354; 375/295; 375/316; 375/340; 375/359; 375/371

(58) Field of Classification Search
CPC ....... H04L 7/00; H04L 7/0012; H04L 7/0083; H04N 21/4305; G06F 1/10; G06F 12/0813; G06F 12/0822; G06F 15/17375; G06F 13/4286; G06F 15/08; G06F 3/00; A61B 2560/0271; A61B 2560/045; A61B 5/0022; A61B 5/14532; G01N 33/48792; H05K 1/0269; H05K 2201/10424; H05K 2203/166; H05K 3/0008; H05K 3/0052; H05K 3/0097; H05K 3/225
USPC ......... 375/219, 224, 254, 295, 297, 302, 316, 375/327, 340, 354, 359, 362, 371, 373, 376
See application file for complete search history.

(56) References Cited

U.S. PATENT DOCUMENTS

| | | | |
|---|---|---|---|
| 6,757,348 B1 * | 6/2004 | Vila et al. ..................... 375/372 |
| 7,599,459 B2 * | 10/2009 | Okuyama .................... 375/372 |
| 7,613,959 B2 * | 11/2009 | Tseng ........................... 714/704 |
| 7,778,373 B2 | 8/2010 | Kumar et al. |
| 8,285,884 B1 * | 10/2012 | Norrie ............................. 710/14 |
| 8,352,773 B2 * | 1/2013 | Chuang et al. ............... 713/503 |
| 2007/0177701 A1 * | 8/2007 | Thanigasalam ............... 375/372 |
| 2008/0304415 A1 * | 12/2008 | Cunningham ................ 370/235 |

(Continued)

FOREIGN PATENT DOCUMENTS

WO   2010036899 A1   4/2010

OTHER PUBLICATIONS

U.S. Appl. No. 13/670,086, filed Nov. 6, 2012, entitled "Selective Insertion of Clock Mismatch Compensation Symbols in Signal Transmissions".

(Continued)

*Primary Examiner* — Hirdepal Singh

(57) ABSTRACT

A transmitting interconnect interface inserts clock mismatch compensation symbols into a transmitted data stream so as to allow the receiving interconnect interface to compensate for clock frequency mismatch between transmit-side and receive-side clocks. The transmitting interconnect interface adjusts the rate of insertion of these symbols based on a determination of the clock frequency mismatch. The transmitting interconnect interface can incrementally adjust the insertion rate to change substantially proportionally with changes in the clock frequency mismatch. Alternatively, the transmitting interconnect interface can set the insertion rate to one of two levels. By adapting the insertion rate to the current measured clock frequency mismatch, the bandwidth penalty incurred by transmitting clock mismatch compensation symbols in excess of that necessary to permit receiver clock tolerance compensation can be reduced, thereby permitting more transmit bandwidth to be used for transmitting data.

19 Claims, 4 Drawing Sheets

(56) References Cited

U.S. PATENT DOCUMENTS

| | | | |
|---|---|---|---|
| 2009/0086874 A1* | 4/2009 | Wang et al. | 375/372 |
| 2010/0080331 A1* | 4/2010 | Garudadri et al. | 375/354 |
| 2010/0315135 A1* | 12/2010 | Lai et al. | 327/145 |
| 2011/0113293 A1* | 5/2011 | Ikeda | 714/701 |
| 2011/0241749 A1* | 10/2011 | Kaviani et al. | 327/295 |
| 2011/0309948 A1 | 12/2011 | Montgomery et al. | |
| 2012/0140781 A1* | 6/2012 | Green | 370/503 |
| 2013/0223552 A1* | 8/2013 | Okada | 375/267 |

OTHER PUBLICATIONS

Reginald Conley, "PCIe Goes Clockless—Achieving Independent Spread-spectrum Clocking Without SSC Isolation", EE Times, <http://www.eetimes.com/document.asp?doc_id=1279744>, Jul. 5, 2012, 9 pages.

International Search Report and Written Opinion correlating to PCT/CA2013/050845 dated Feb. 24, 2014, 7 pages.

* cited by examiner

ADAPTIVE CLOCK MISMATCH COMPENSATION SYMBOL INSERTION IN SIGNAL TRANSMISSIONS

CROSS-REFERENCE TO RELATED APPLICATIONS

The present disclosure is related to U.S. patent application Ser. No. 13/670,086 filed on even date herewith and entitled "Selective Insertion of Clock Mismatch Compensation Symbols in Signal Transmissions," the entirety of which is incorporated by reference herein.

BACKGROUND

1. Field of the Disclosure

The present disclosure generally relates to transmitter interconnect interfaces, and, more particularly, to clock mismatch compensation between a transmitter interconnect interface and a receiver interconnect interface.

2. Description of the Related Art

In many systems, the transmitting side and receiving side of an interconnect may operate using independent clock sources, which can introduce a frequency mismatch. To compound this problem, certain interconnect specifications, such as the Peripheral Component Interconnect Express (PCIe) specification, permit the use of spread spectrum clocking, and may permit multiple spread spectrum clock domains to be used in the system, which can result in an even greater clock mismatch in the event that one side is using spread spectrum clocking (SSC) and the other is not, or that one side is in one spread spectrum clock domain and the other is in a different spread spectrum clock domain. Many interconnect specifications attempt to address the potential for frequency mismatch by specifying the insertion of skip ordered sets. For example, the PCIe specification implements a skip ordered set as physical layer packets having a COM character followed by three SKP characters. Skip order sets are inserted at a fixed rate into a transmitted data stream, such that the skip ordered sets can be dropped from the data stream or buffered in an elastic buffer at the receiver side so as to prevent buffer underflow. However, these specifications call for a rate of insertion of skip ordered sets that reflects a worst-case frequency mismatch scenario, and thus waste interconnect bandwidth.

BRIEF DESCRIPTION OF THE DRAWINGS

The present disclosure may be better understood, and its numerous features and advantages made apparent to those skilled in the art by referencing the accompanying drawings. The use of the same reference numbers in different drawings indicates similar or identical items.

DETAILED DESCRIPTION

Figure 1:
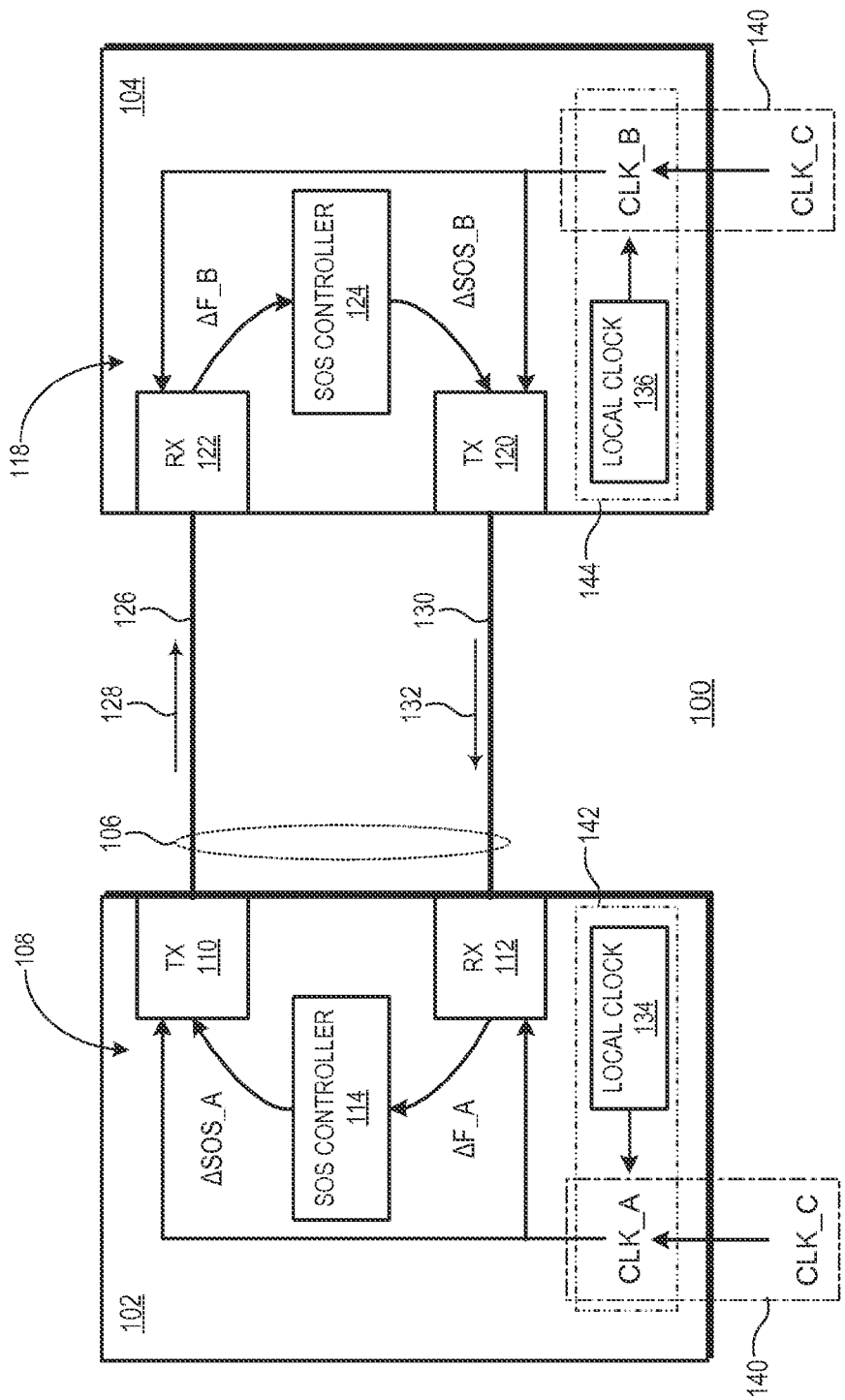
FIG. 1 is a block diagram illustrating a system employing adaptive clock mismatch compensation symbol insertion for data streams in accordance with some embodiments.

FIGS. 1-7 illustrate example techniques for adapting to frequency mismatches between a transmit-side clock and a receive-side clock of an interconnect (serial or parallel) by adapting a rate at which clock mismatch compensation symbols are inserted into a transmitted data stream (also referred to herein as the "insertion rate"). In some embodiments, a transmitting interconnect interface inserts clock mismatch compensation symbols into a transmitted data stream so as to allow the receiving interconnect interface to compensate for clock frequency mismatch between transmit-side and receive-side clocks by either storing the clock mismatch compensation symbols in an elastic buffer to avoid buffer underflow, or by deleting the clock mismatch compensation symbols from the elastic buffer (or dropping them from the data stream) to avoid buffer overflow. However, rather than fixing the rate at which the clock mismatch compensation symbols are inserted into the transmitted data stream, the transmitting interconnect interface adjusts or otherwise adapts the rate of insertion of clock mismatch compensation symbols based on a representation of the clock frequency mismatch. By adapting the rate of insertion of clock mismatch compensation symbols to the current measured clock frequency mismatch, the bandwidth penalty incurred by transmitting clock mismatch compensation symbols in excess of that necessary to permit receiver clock tolerance compensation can be reduced or avoided, thereby permitting more of the transmit bandwidth to be used for transmitting data.

The term "clock mismatch compensation symbol" refers to any set of one or more symbols or characters inserted into a data stream to facilitate receiver buffer overflow/underflow control due to clock frequency mismatch. For ease of illustration, the techniques of the present disclosure are described in an example context of skip ordered sets as clock mismatch compensation symbols. However, the disclosed techniques can be implemented with any of a variety of clock mismatch compensation symbols, and thus reference herein to "skip ordered sets" applies to other types of clock mismatch compensation symbols unless otherwise noted. Moreover, although the techniques of the present disclosure are described primarily in the example context of a Peripheral Component Interconnect Express (PCIe)-based interconnect, these techniques can be employed in transmission systems compatible with any of a variety of interconnect specifications that employ skip ordered sets or other clock mismatch compensation symbols for receiver clock tolerance compensation, such as the Universal Serial Bus (USB) specifications, the Serial ATA (SATA) specifications, and the Infiniband specifications.

Moreover, although techniques are described in the example context of serial interconnects and serial transmissions for ease of illustration, these techniques are not limited to serial transmission systems, but instead may be implemented in any of a variety of serial or parallel transmission systems in which the receive-side interconnect can obtain or infer a representation of the clock frequency of the transmit-side interconnect, either directly (e.g., with a forwarded clock) or indirectly (e.g., via clock recovery). Accordingly, unless otherwise noted, reference to "serial" applies equally to "parallel."

FIG. 1 illustrates a data transmission system 100 employing adaptive skip ordered set insertion in accordance with some embodiments. The data transmission system 100 includes devices 102 and 104 connected via an interconnect 106. The devices 102 and 104 can include any of a variety of devices that communicate information via serial or parallel transmission links, such as central processing units (CPUs), graphical processing units (GPUs) and other processors, peripheral components, such as add-on boards, storage devices, and the like. The interconnect 106 can include any of a variety of interconnects that utilize skip ordered sets to facilitate receiver clock mismatch compensation, such as interconnects compliant with one or more of the Peripheral Component Interconnect Express (PCIe) specifications, one or more of the USB specifications, one or more SATA specifications, one or more of the Infiniband specifications, one or more of the DisplayPort specifications, one or more of the Thunderbolt specifications, and the like. For example, the device 102 can include a processor or other component on a motherboard and the device 104 can include an add-on board, flash memory device, or other peripheral component connected to the motherboard via a PCIe expansion slot. As another example, the devices 102 and 104 can include field replaceable units (FRUs) or server blades connected via a PCIe-based backplane (one example of the interconnect 106). As yet another example, the device 102 can include a notebook computer and the device 104 can include a flash storage device, and the interconnect 106 can comprise a USB 3.0 cable connecting the flash storage device to the motherboard.

In the depicted example, the device 102 includes an interconnect interface 108 comprising a transmitter interface 110, a receiver interface 112, and a clock mismatch compensation system controller 114 (also referred to herein as the skip ordered set (SOS) controller 114). The device 104 is similarly configured and includes an interconnect interface 118, a transmitter interface 120, a receiver interface 122, and an SOS controller 124. The transmitter interface 110 includes an input (not shown) to receive data to be transmitted and an output coupled to a lane 126 of the interconnect 106, whereby the transmitter interface 110 is configured to transmit the data to the receiver interface 122 of the device 104 as a data stream 128 via the lane 126. Similarly, the transmitter interface 120 includes an input (not shown) to receive data to be transmitted and an output coupled to a lane 130 of the interconnect 106, whereby the transmitter interface 120 is configured to transmit the data to the receiver interface 112 of the device 102 as a data stream 132 via the lane 130. As such, the interconnect interface 108 is "transmit-side" relative to data stream 128 and "receive-side" relative to data stream 132, whereas the interconnect interface 118 is "transmit-side" relative to data stream 132 and "receive-side" relative to data stream 128.

In some embodiments, the transmitter interface 110 uses a transmit clock signal based on a local clock signal (denoted "CLK_A" in FIG. 1) to transmit the data stream 128 and the receiver interface 112 uses a receive clock signal based on the local clock signal CLK_A to process the data stream 132 once received. The local clock signal CLK_A may be generated by a local clock source 134 (e.g., a crystal oscillator) or derived from a distributed clock signal (denoted "CLK_C" in FIG. 1) via a phase locked loop (PLL) or other clock synchronization device. For example, the data transmission system 100 can include a motherboard with PCIe expansion slots and the distributed clock signal CLK_C can include, for example, a clock signal distributed across the motherboard to various PCIe expansion slots. The clock signal CLK_A may be generated by, for example, frequency spreading the distributed clock signal CLK_C at the transmitter interface 110 to generate a spread spectrum clock signal used as the clock signal CLK_A. With reference to the device 104, the transmitter interface 120 uses a transmit clock signal based on a local clock signal (denoted "CLK_B" in FIG. 1) to transmit the data stream 132 and the receiver interfaces 122 uses a receive clock signal based on the local clock signal CLK_B to process the received data stream 128. The local clock CLK_B may be generated by a local clock source 136 or derived from the distributed clock signal CLK_C.

Ideally, the clock signals CLK_A and CLK_B used by the interconnect interfaces 108 and 118 would have the exact same frequency and thus be perfectly synchronized. However, in practical applications, there typically is a non-trivial clock frequency mismatch between the transmit side and the receive side of an interconnect due to both physical limitations and tolerance mismatches in the clock signal sources, as well as the use of certain techniques, such as spread spectrum clocking. To illustrate, the PIle specification provides that, in the absence of spread spectrum clocking, the local clock signals used by the PCIe hosts (that is, the interconnect interfaces 108 and 118) should be 100 megahertz (MHz) with an accuracy of at least +/−300 parts per million (ppm). However, the Me specification also allows for spread spectrum clocking, which center-spreads or down-spreads the local clock signal using a modulation signal having a frequency of up to 33 kilohertz (kHz), with a resulting accuracy requirement of at least +/−5000 ppm. Moreover, the PCIe specification permits the transmit side and receive side of a data stream to be clocked independently, that is, to have separate clock domains, particularly if the two sides are in different physical systems. Thus, for a data stream transmitted with both the transmit and receive sides each implementing spread spectrum clock signals in separate clock domains, the interconnect interface will need to tolerate an accuracy of at least 5600 ppm since the slower clock signal can be on either side of the link.

In view of the potential for clock frequency mismatch, each of the transmitter interfaces 110 and 120 is configured to insert skip ordered sets into their respective transmitted data streams so as to allow the receiver interfaces 112 and 122 to compensate for any clock frequency mismatch. This compensation can include storing skip symbols in addition to the received skip ordered sets in the elastic buffer of the receiver interface to prevent buffer underflow when the receive-side clock frequency is greater than the transmit-side clock frequency. This compensation alternatively can include deleting skip ordered sets from the elastic buffer, or otherwise deleting them from the data stream, to prevent buffer overflow when the transmit-side clock frequency is greater than the receive-side clock frequency.

Conventional interconnect interfaces typically fix the SOS insertion rate to accommodate a worst-case scenario for clock frequency mismatch. To illustrate, in light of the worst-case scenario of a clock frequency mismatch of 5600 ppm due to separate SSC domains, the PCIe specification calls for a skip ordered set to be inserted into the transmitted data stream every 154 symbols on a packet boundary, and thus requiring dedication of 2-5% of the lane bandwidth to the transmission of skip ordered sets. However, in the event that the transmit side and the receive side are in a common clock domain (that is, clocked by the same clock signal or by clock signals referenced to the same source clock signal or by clock signals within +/−300 ppm of each other), the clock frequency mismatch is likely to be +/−300 ppm or less. As such, fixing the skip ordered set insertion rate to the rate needed to handle a worst-case scenario leads to wasted bandwidth in situations exhibiting a better-than-worse-case clock frequency mismatch.

To reduce or eliminate unnecessary skip ordered set insertion, and thus free up bandwidth for data transmission, the interconnect interfaces 108 and 118 adapt the rate of insertion of skip ordered sets into the respective data streams based on measured or inferred clock frequency mismatches between the transmit side and the receive side. In some embodiments, the SOS controller 114 of the interconnect interface 108 determines a clock frequency mismatch (referred to herein as clock frequency mismatch $\Delta F\_A$) between the local clock signal CLK_A used by the transmitter interface 110 of the interconnect interface 108 and the local clock signal CLK_B used by the interconnect interface 118 and, based on the clock frequency mismatch $\Delta F\_A$, adjusts the SOS insertion rate by the transmitter interface 110 for the data stream 128 by providing an adjust signal $\Delta SOS\_A$ to the transmitter interface 110.

The adjustment to the SOS insertion rate can be made an that a change in the SOS insertion rate is substantially proportional to, or reflective of, a change in the clock frequency mismatch $\Delta F\_A$. The SOS controller 114 may employ different thresholds so that when the clock frequency mismatch $\Delta F\_A$ exceeds one threshold, the rate of insertion of skip ordered sets is incrementally increased, when the clock frequency mismatch $\Delta F\_A$ falls below another threshold, the rate of insertion of skip ordered sets is incrementally decreased, and otherwise is maintained at the same rate.

Alternatively, the adjustment to the SOS insertion rate can include alternating between two preset rates. For example, the SOS controller 114 can use a threshold that represents whether the interconnect interfaces 108 and 118 are in the same clock domain 140 or in different clock domains 142 and 144, respectively. In the event that the magnitude of the clock frequency mismatch $\Delta F\_A$ is greater than this threshold, the SOS controller 114 determines that two different SSC domains are in use (that is, the interconnect interfaces 108 and 118 are separately clocked), and thus the SOS controller 114 sets the SOS insertion rate to a maximum rate to cover, for example, the worst-case scenario described above. In the event that the magnitude of the clock frequency mismatch $\Delta F\_A$ is not greater than this threshold, the SOS controller 114 determines that the same SSC domain is in use (that is, the interconnect interfaces 108 and 118 are in the same SSC domain) or that two different non-SSC domains are in use, and thus the SOS controller 114 sets the SOS insertion rate to a minimum rate. A similar approach may be implemented for more than two preset rate levels.

The SOS controller 114 can determine the clock frequency mismatch $\Delta F\_A$ in a variety of ways. For example, the transmitter interface 120 of the interconnect interface 118 may encode the local clock signal CLK_B into the data stream 132, and the SOS controller 114 thus can recover a clock signal having a frequency substantially equal to the frequency of the local clock signal CLK_B from the clock information encoded in the data stream 132. Alternatively, the transmitter interface 120 may forward the local clock signal CLK_B as a separate signal conducted over the interconnect 106 in association with the data stream transmitted by the transmitter interface 120 over the interconnect 106. This recovered or forwarded representation of the local clock signal CLK_B is referred to herein as remote clock signal CLK_RX. The remote clock signal CLK_RX thus is a receive-side representation of the transmit-side local clock, and therefore can be used as a proxy for the local clock signal CLK_B in determining the frequency mismatch $\Delta F\_A$.

In some embodiments, the remote clock signal CLK_RX is used to determine the frequency mismatch $\Delta F\_A$ by detecting a rate of phase difference shift or change between the local clock signal CLK_A and the remote clock signal CLK_RX. The receiver interface 112 may employ an elastic buffer to buffer received data from the data stream 132, whereby the data is clocked into the buffer using the remote clock signal CLK_RX and clocked out of the buffer using the local clock signal CLK_A, and thus the SOS controller 114 can determine the frequency mismatch $\Delta F\_A$ based on a rate of change in the fullness of the elastic buffer. These two example approaches are described in greater detail below with reference to FIGS. 3-5.

The interconnect interface 118 of the device 104 may operate in a similar manner whereby the SOS controller 124 determines a clock frequency mismatch (referred to herein as clock frequency mismatch $\Delta F\_B$) between the local clock signal CLK_B used by the transmitter interface 120 of the interconnect interface 118 and the clock signal CLK_A used by the remote interconnect interface 108 and, based on the clock frequency mismatch $\Delta F\_B$, adjusts the SOS insertion rate by the transmitter interface 120 for the data stream 132 by providing an adjust signal $\Delta SOS\_B$ to the transmitter interface 120 to compensate for changes in the clock CLK_A used by the receiver interface 112. However, the techniques described herein do not require both sides of the interconnect 106 be configured to adapt the SOS insertion rate for a given data stream. That is, the data transmission system 100 can be configured so that only one interconnect interface adjusts its SOS insertion rate, and the other device may default to a fixed SOS insertion rate for its transmitted data streams. For example, the device 102 may employ the SOS controller 114 to adapt the SOS insertion rate for the transmitted data stream 128, whereas the device 104 may implement a conventional interconnect interface that defaults to a fixed SOS insertion rate for the transmitted data stream 132. In this configuration, only the transmitted data stream 128 would enjoy the improved available bandwidth due to the reduction or elimination of skip ordered sets unnecessary to provide sufficient receiver clock mismatch compensation. As such, devices employing the techniques described herein may continue to operate with conventional devices without requiring modification to the conventional devices in order to implement these techniques.

Figure 2:
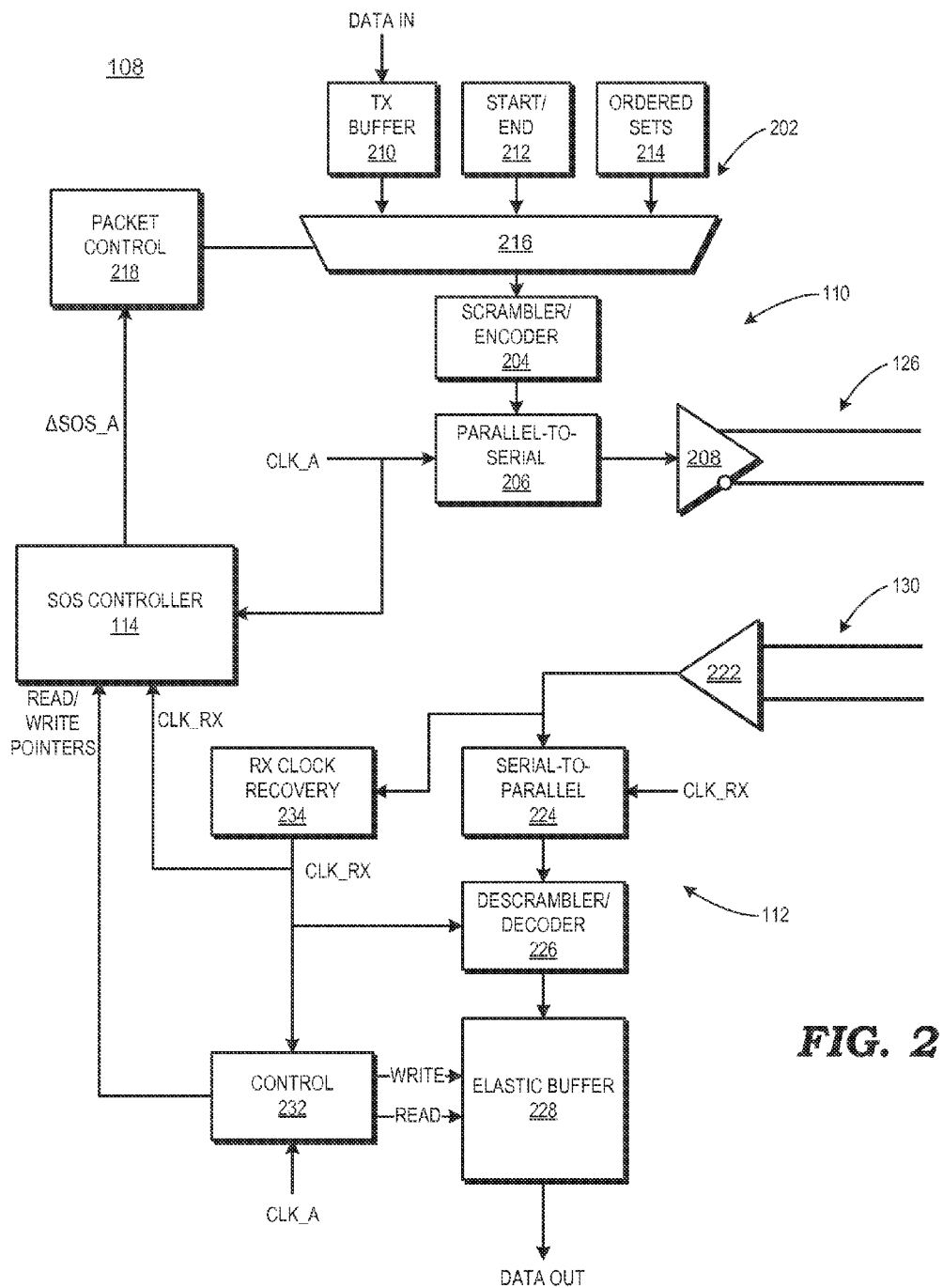
FIG. 2 is a diagram illustrating an interconnect interface employing adaptive clock mismatch compensation symbol insertion in accordance with some embodiments.

FIG. 2 illustrates an implementation of the interconnect interface 108 in greater detail in accordance with some embodiments. In the depicted example, the transceiver interface 110 includes a packet stream generator 202, a scrambler/encoder 204, a parallel-to-serial converter 206, and a differential line driver 208. The packet stream generator 202 generates a packet stream from data provided by a component of the device 102 for transmission, and includes a transmit buffer 210, a control character generator 212, an ordered sets generator 214, a multiplexer 216, and a packet control module 218. The transmit buffer 210 stores the data provided for transmission. The control character generator 212 outputs start characters, end characters, and other control characters. The ordered sets generator 214 provides characters for various types of ordered sets, including skip ordered sets, training ordered sets, electrical idle ordered sets, and the like. For example, under the PCIe specification, a skip ordered set is comprised of a COM character and one or more SKIP characters, whereby each character is converted to a corresponding symbol for transmission over the physical link. The packet control module 218 controls the multiplexer 216 so as to generate the packet stream by selecting between data characters from the transmit buffer 210, control characters from the control character generator 212, and ordered set characters from the ordered sets generator 214 to generate the symbols of the packet stream. Thus, in this example the packet control module 218 controls the rate at which skip ordered sets are inserted into the packet stream, and thus ultimately into the transmitted data stream 128, through manipulation of the multiplexer 216.

The scrambler/encoder 204 scrambles and encodes the packets of the packet stream. To illustrate, per the PCIe 3.0 specification the scrambler/encoder 204 can include a 128b/130b encoder to encode every 128 bit datagram of the original packet stream into a 130 bit datagram, or per the 2.0 specification, the scrambler/encoder 204 can include an 8b/10b encoder to encode every 8 bit datagram into a 10 bit datagram. This encoding process can include the embedding or other encoding of clock information, such as encoding of the local clock signal CLK_A (or a clock signal derived therefrom) into the resulting data stream using any of a variety of well-known clock encoding techniques, and thus allowing the clock information to be recovered on the receive side using any of a variety of well-known clock recovery techniques. The resulting encoded data stream is serialized by the parallel-to-serial converter 206 using the local clock signal CLK_A (or a clock signal derived therefrom) to generate a data stream (e.g., data stream 128, FIG. 1) and the resulting data stream is transmitted over the wire pair of the lane 126 using the differential line driver 208.

In the depicted example, the receiver interface 112 includes a differential receiver 222, a serial-to-parallel converter 224, a descrambler/decoder 226, an elastic buffer 228, a buffer controller 232, and a receive clock recovery module 234. The receiver interface 112 receives a transmitted data stream (e.g., data stream 132, FIG. 1) via the wire pair of the lane 130 and provides the serialized data to the serial-to-parallel converter 224, which parallelizes the data into a stream of characters. The descrambler/decoder 226 descrambles or decodes the characters (e.g., converts from a 130 bit datagram to a 128 hit datagram, or from a 10 bit datagram to an 8 bit datagram), and stores the resulting data in the elastic buffer 228 using a WRITE pointer (or head pointer). The buffered data can be subsequently retrieved from the elastic buffer 228 using a READ pointer (or tail pointer) and provided to a component of the device 102 for processing. The buffer controller 232 manages READ and WRITE pointers for the elastic buffer 228, and otherwise manages the use of the elastic buffer 228.

As noted above, the transmitter interface connected to the lane 130 (that is, transmitter interface 120, FIG. 1), in some embodiments, encodes its local dock signal CLK_B into the data stream 132 as part of the 128b/130b or 8b/10b encoding process. The receiver clock recovery module 234 recovers this clock information from the data stream 132 and provides the resulting remote dock signal CLK_RX. Thus, the remote clock signal CLK_RX is a proxy for, or otherwise representative of, the local clock signal CLK_B used at the transmit side. Alternatively, the local clock signal CLK_B may be forwarded by the transmitter interface 120 as a separate clock signal via the interconnect 106.

As the serial-to-parallel converter 224 and the input of the elastic buffer 228 typically are synchronized to the transmit side, the remote clock signal CLK_RX may be used by the serial-to-parallel converter 224 to convert the data stream 132 and by the buffer control 232 to clock data into the elastic buffer 228. However, data typically is retrieved from the elastic buffer 228 using the local clock signal CLK_A of the interconnect interface 108. Thus, the elastic buffer 228 spans both the transmit-side clock domain (synchronized to the remote clock signal CLK_RX/CLK_B) and the receive-side clock domain (synchronized to the local clock signal CLK_A).

Figure 3:
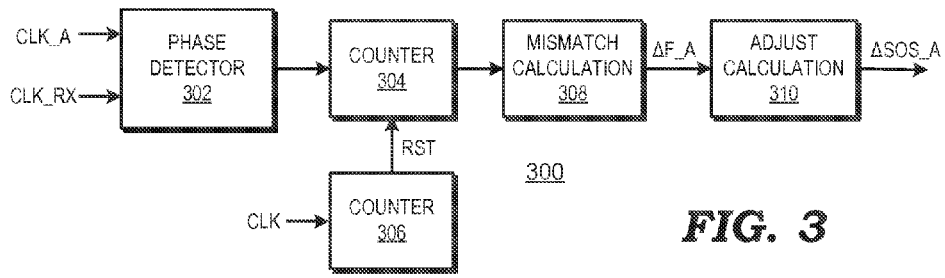
FIG. 3 is a diagram illustrating a frequency mismatch calculation module for determining a frequency mismatch between transmit-side and receive-side clocks based on a rate of phase changes between the transmit-side clock and the receive-side clock in accordance with some embodiments.
Figure 4:
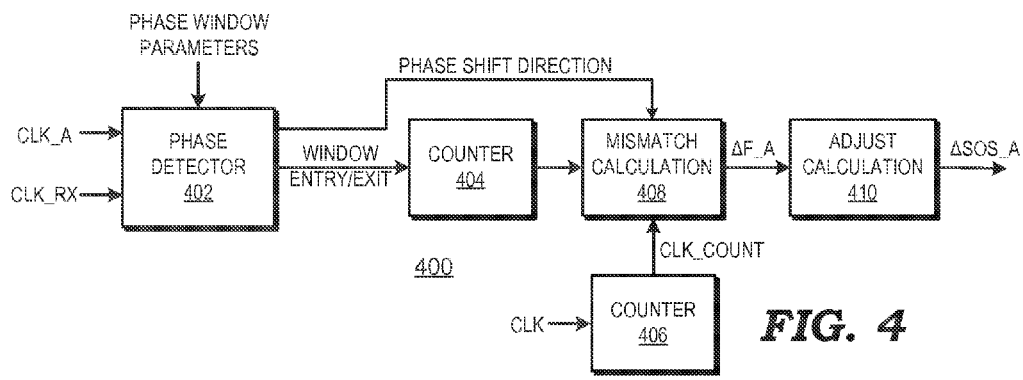
FIG. 4 is a diagram illustrating a frequency mismatch calculation module for determining a frequency mismatch between transmit-side and receive-side clocks based on an application of a phase window to a phase difference between the transmit-side clock and the receive-side clock in accordance with some embodiments.

As described above, the SOS controller 114 adjusts the rate of insertion of skip ordered sets into the packet stream ultimately transmitted as data stream 128 based on the clock frequency mismatch $\Delta F\_A$ between the local clock signal CLK_A of the interconnect interface 108 and the local clock signal CLK_B of the interconnect interface 118. As also noted above, the remote clock signal CLK_RX represents the local clock signal CLK_B of the interconnect interface 118 and thus may be used to measure or otherwise determine this clock frequency mismatch $\Delta F\_A$. FIGS. 3 and 4 illustrate example techniques that can be employed by the SOS controller 114 to determine the clock frequency mismatch $\Delta F\_A$.

Based on the determined clock frequency mismatch $\Delta F\_A$, the SOS controller 114 generates an adjust signal $\Delta SOS\_A$ to direct the packet control module 218 to change the rate of insertion of skip ordered sets into the packet stream accordingly. In some embodiments, the SOS controller 114 compares the clock frequency mismatch $\Delta F\_A$ to one or more thresholds and directs the packet control module 218 to increment or decrement the skip ordered set insertion rate based on the relationship of the clock frequency mismatch $\Delta F\_A$ to the one or more thresholds. In other embodiments the SOS controller 114 switches between two preset skip ordered set insertion rates based on whether the clock frequency mismatch $\Delta F\_A$ exceeds a certain threshold, such as a threshold set to reflect whether the local clock signals CLK_A and CLK_B are in the same SSC domain or separate SSC domains.

In some embodiments, the SOS controller 114 determines the SOS insertion rate during, for example, training of the interconnect interface 108 and then maintains the interconnect interface 118 at this rate until a power-on reset or other event that causes the retraining of the interconnect interface 118. In another embodiment, the SOS controller 114 monitors fluctuations in the clock frequency mismatch $\Delta F\_A$ and dynamically adjusts the SOS insertion rate accordingly.

Figure 5:
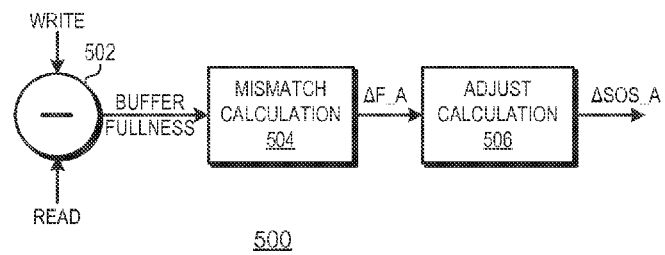
FIG. 5 is a diagram illustrating a frequency mismatch calculation module for determining a frequency mismatch between transmit-side and receive-side clocks based on a rate of change in a buffer fullness of an elastic buffer of an interconnect interface in accordance with some embodiments.

FIGS. 3-5 illustrate example mechanisms employed by the SOS controller 114 for determining the clock frequency mismatch $\Delta F\_A$ at the interconnect interface 108 of FIGS. 1 and 2. FIG. 3 depicts a frequency mismatch calculation module 300 that uses phase changes to determine the clock frequency mismatch $\Delta F\_A$ in accordance with some embodiments. In the depicted example, the frequency mismatch calculation module 300 includes a phase detector 302, counters 304 and 306, a mismatch calculation module 308, and an adjustment calculation module 310. The phase detector 302 includes inputs to receive the local clock signal CLK_A and the remote clock signal and an output that is asserted for every distinct phase change between the two input clock signals. The counter 304 includes an input coupled to the output of the phase detector 302 and an output to provide a count of the number of distinct phase changes between resets resulting from assertion of a reset signal RST. The counter 306 includes an input to receive a clock signal and an output to assert the RST signal when the counter reaches its terminal count. As such, the value output by counter 304 represents the number of detected phase changes in a period of time represented by the terminal count of the counter 306. The mismatch calculation module 308 includes a buffer to store a recent history of the values output by the counter 304 and logic to calculate a rate of change in the number of detected phase changes per unit time. The mismatch calculation module 308 provides an indicator of this rate of change in the number of detected phase changes per unit time as a calculation of the clock frequency mismatch $\Delta F\_A$. The adjust calculation module 310 then compares this indicator of the rate of change in the number of detected phase changes per unit time, or indicator of the clock frequency mismatch $\Delta F\_A$, to one or more thresholds to determine an appropriate adjustment, if any, to the SOS insertion rate implemented by the transmitter interface 110. If an adjustment to the SOS insertion rate is deemed appropriate, the adjust calculation module 310 then configures the adjust signal $\Delta SOS$ accordingly.

FIG. 4 depicts a frequency mismatch calculation module 400 that utilizes a phase window to determine the clock frequency mismatch $\Delta F\_A$ in accordance with some embodiments. In the depicted example, the frequency mismatch calculation module 400 includes a phase detector 402, counters 404 and 406, a mismatch calculation module 408, and an adjustment calculation module 410. The phase detector 402 includes inputs to receive the local clock signal CLK_A and the remote clock signal CLK_RX, inputs to receive phase window parameters defining one or more phase windows to be applied to a phase difference between the local clock signal CLK_A and the recovered clock signal CLK_RX, an output that is asserted whenever the phase difference enters or leaves a phase window defined by the phase window parameters, and an output that indicate the phase-shift direction (advancing or retreating) upon entering or leaving a phase window defined by the phase window parameters. The outputs of the phase detector 402 can include separate outputs to signal when the phase difference shifts into a phase window (an "entry" into the phase window) and to signal when the phase difference shifts out of a phase window (an "exit" from the phase window).

The counter 404 includes an input coupled to the output of the phase detector 402 and one or both of an output to provide a count of the number of phase window entries/exits and an output to provide an indicator of the duration between successive phase window entries/exits, whereby separate counts can be provided for phase window entries and phase window exits, duration within a phase window, duration between successive entries/exits into/from a phase window, duration between entries/exits into/from successive phase windows, for each defined phase window. The counter 306 includes an input to receive a clock signal CLK and an output to provide one or more count values (identified collectively as CLK_COUNT), where the one or more count values can include counted clock cycles of the clock signal CLK representative of one or more of the phase-window entry/exit durations identified above. The mismatch calculation module 408 includes a buffer to store a recent history of the phase window entry/exit counts output by the counter 404 and logic to calculate the clock frequency mismatch $\Delta F\_A$ based on these phase window entry/exit counts and the clock cycle durations between phase window entries/exits.

In operation, the phase window parameters are programmed by software or hardcoded to specify one or more phase windows. For example, the phase window parameters could define a phase difference range, at 0 degrees offset, of +X degrees/−Y degrees (X and Y being real numbers greater than or equal to 0), or a phase difference range of say, 0 degrees+/−X degrees. If the clock signals have the typical 50:50 duty cycle, the phase window parameters could define a second phase window at 180 degrees, such as a phase window, at 180 degrees offset, of +W degrees/−Z degrees (W and Z being real numbers greater than or equal to 0, and whereby X and W can be the same number and Y and Z can be the same number). When the phase difference between clock signal CLK_A and clock signal CLK_RX enters the defined phase window, the phase detector 402 asserts a window entry signal. Likewise, when the phase difference exits the defined phase window, the phase detector 402 asserts a window exit signal. The counter 404 counts the assertions of the window entry signal and the assertions of the window exit signal. In the event of that the defined phase window can be bounded (e.g., is a range of 0+/−X degrees), then the mismatch calculation module 408 can use the number of clock cycles (as counted by the counter 406) occurring between when the phase difference enters the phase window and when the phase difference next exits the phase window as an estimate of the clock frequency mismatch $\Delta F\_A$. Furthermore, the mismatch calculation module 408 can determine the polarity of the clock frequency mismatch $\Delta F\_A$ by monitoring whether the entry into, or exit from, the phase window was from the "plus" outside edge (e.g., from 0+X degrees) or the "minus" outside edge (e.g., from 0−X degrees).

In certain implementations, physical manufacturing tolerances may make it difficult to implement a margined phase bound for the phase window. In such instances, rather than using the lapsed clock cycles between a phase window entry and a phase window exit to estimate the clock frequency mismatch $\Delta F\_A$, the mismatch calculation module 408 can measure the number of clock cycles between successive entries into a phase window at the 0 degree offset (which represents the number of clock cycles it takes for the phase difference between CLK_A and CLK_RX to drift or shift 360 degrees) as a representation of the current clock frequency mismatch $\Delta F\_A$. To increase responsiveness (and thus allow narrower guard bands), two phase windows can be used, for example at 0 degrees and 180 degrees, and the mismatch calculation module 408 can measure the number of clock cycles between entry into the 0 degree phase window and the 180 degree phase window as a representation of the clock cycles needed for the phase difference to shift or drift 180 degrees, and from this estimate the current clock frequency mismatch $\Delta F\_A$. In both instances, the duration needed to span the 180 degree phase shift or the 360 degree phase shift is inversely proportional to the clock frequency mismatch $\Delta F\_A$ and directly proportional to the rate at which clock rate compensation symbols are to be inserted into the transmitted stream.

The adjust calculation module 410 then uses this indicator of the clock frequency mismatch $\Delta F\_A$ to determine an appropriate adjustment, if any, to the SOS insertion rate implemented by the transmitter interface 110. In one embodiment, this adjustment may be directly calculated from the indicator of the clock frequency mismatch $\Delta F\_A$ using a specified calculation or formula. For example, the duration needed for the phase difference between CLK_A and CLK_RX to span the 180 degree phase shift or the 360 degree phase shift is inversely proportional to the clock frequency mismatch $\Delta F\_A$ and directly proportional to the rate at which clock rate compensation symbols are to be inserted into the transmitted stream. In other embodiments, the adjust calculation module 410 may use lookup tables that provide SOS insertion rates corresponding to different clock frequency mismatch ΔF_A or different ranges of clock frequency mismatches. Alternatively, specified thresholds may be used to trigger predetermined adjustments to the SOS insertion rate. If an adjustment to the SOS insertion rate is deemed appropriate, the adjust calculation module 410 then configures the adjust signal ΔSOS accordingly.

The adjustment to the SOS insertion rate can include, for example, cessation of SOS insertion into the transmitted data stream. In certain implementations, the elastic buffer 228 at the receiver may be capable of operating at "nominal empty" such that the lack of data in the data stream can be readily accommodated by introducing a bubble into the receiver processing pipeline. In such instances, the SOS insertion rate could be zeroed out when the mismatch calculation module 408 detects from the polarity of the clock frequency mismatch ΔF_A that the frequency of clock CLK_A is less than the frequency of clock CLK_RX. In other implementations, the elastic buffer 228 at the receiver may be managed around "nominal half" and does not accommodate introduction of bubbles into the receiver processing pipeline. In such instances, the adjust calculation module 410 could use the absolute value of the clock frequency mismatch ΔF_A to adjust the SOS insertion rate proportionally.

FIG. 5 depicts a frequency mismatch calculation module 500 that uses the change in fullness of the elastic buffer 228 (FIG. 2) to determine the clock frequency mismatch ΔF_A in accordance with some embodiments. In the depicted example, the frequency mismatch calculation module 500 includes a subtraction module 502, a mismatch calculation module 504, and an adjust calculator 506. As described above, data is clocked into the elastic buffer 228 using the remote clock signal CLK_RX (which represents the local clock signal CLK_B of the transmit side), but the data is clocked out of the elastic buffer 228 using the local clock signal CLK_A. As such, a mismatch in frequencies between the local clock signal CLK_B and CLK_A will manifest itself through a change in the fullness of the elastic buffer 228 over time. Accordingly, the rate of change in the fullness of the elastic buffer 228 can be used to calculate the clock frequency mismatch ΔF_A.

In operation, the subtraction module 502 determines the current fullness of the elastic buffer 228 by determining the distance between the current position of the mum pointer (FIG. 2) (that is, where the next data is to be stored in the elastic buffer 228) and the READ pointer (FIG. 2) (that is, where the next data is to be read from in the elastic buffer 228). In some embodiments, the buffer fullness is determined by performing a subtraction operation using the WRITE pointer and the READ pointer. The mismatch calculation module 504 includes a buffer to store a recent buffer fullness values output by the subtraction module 502 and logic to calculate a rate of change in the buffer fullness. The mismatch calculation module 504 provides an indicator of this rate of change in the buffer fullness as a measure of the clock frequency mismatch ΔF. The adjust calculation module 506 then compares the indicator of the measured clock frequency mismatch ΔF, provided by the mismatch calculation module 504, to one or more thresholds to determine an appropriate adjustment, if any, to the SOS insertion rate and configure the adjust signal ΔSOS accordingly.

Figure 6:
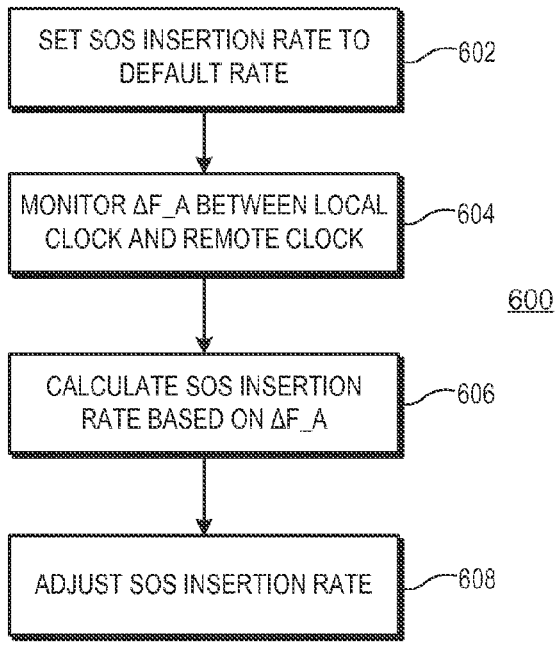
FIG. 6 is a flow diagram illustrating a method for adjusting a rate of insertion of clock mismatch compensation symbols into a transmitted data stream based on a frequency mismatch between transmit-side and receive-side clocks in accordance with some embodiments.

FIG. 6 illustrates a method 600 for adapting an SOS insertion rate for a transmitted data stream in accordance with some embodiments. For ease of illustration, the method 600 is described with reference to an operation of the interconnect interface 108 of the device 102 of FIGS. 1 and 2. The method 600 initiates at block 602, whereby the device 102 initializes after, for example, a power-on reset and, as part of this initialization, the SOS controller 114 sets the SOS insertion rate at a default insertion rate, which typically is a rate reflective of an expected worst-case scenario (e.g., a rate that accommodates separate SSC clock domains at the transmit side and receive side). At block 604, the SOS controller 114 monitors the clock frequency mismatch ΔF_A between the local clock signal CLK_A of the interconnect interface 108 and the remote local clock CLK_B of the remote interconnect interface 118. As described above, the interconnect interface 108 may recover a representation of the local clock signal CLK_B (as remote clock signal CLK_RX) from the data stream 132 transmitted by the interconnect interface 118 and thus the clock frequency mismatch ΔF can be measured by a comparison of the local clock signal CLK_A to the remote clock signal CLK_RX. As also described above, because the remote clock CLK_RX is used to clock the storage of data into the elastic buffer 228 and the local clock signal CLK_A is used to clock the retrieval of data from the elastic buffer 228, the SOS controller 114 alternatively can infer the clock frequency mismatch ΔF_A based on a rate of change in the fullness of the elastic buffer 228.

At block 606, the SOS controller 114 determines the appropriate SOS insertion rate (or adjustment to the current SOS insertion rate) based on the clock frequency mismatch ΔF_A determined at block 604. That is, the SOS controller 114 of the interconnect interface 108 locally detects a change in frequency of the clock used by the opposite interconnect interface 118 and determines whether to compensate for the detected change in the opposite side of the link by adjusting the operation of its transceiver interface at its side of the link.

In one embodiment, the SOS controller 114 can calculate the SOS insertion rate, or adjustment thereto, based on application of a formula or an algorithm. In other embodiments, the SOS controller 114 can calculate the SOS insertion rate, or adjustment thereto, using one or more look-up tables that correlate clock frequency mismatch values or ranges of clock frequency mismatch values to corresponding SOS insertion rates. In yet other embodiments, the SOS controller 114 can implement one or more specified thresholds to determine whether the current clock frequency mismatch ΔF_A compels an adjustment to the SOS insertion rate by the transmitter interface 110 of the interconnect interface 108 to compensate for a change at the interconnect interface 118.

At block 608, the SOS controller 114 configures the adjust signal ΔSOS_A so as to direct the packet control module 218 to adjust the SOS insertion rate to achieve the SOS insertion rate (or adjustment to the SOS insertion rate) determined at block 606.

For example, the SOS controller 114 can use two thresholds, a negative threshold THRESH_N and a positive threshold THRESH_P, because the clock frequency mismatch ΔF_A can be a positive or negative value. In the event that the clock frequency mismatch ΔF_—A is below the threshold THRESH_N (and thus indicating a potential for overflow of the elastic buffer at the receive side) the SOS controller 114 configures the adjust signal ΔSOS_A so as to direct the packet control module 218 to decrease the SOS insertion rate. In the event that the clock frequency mismatch ΔF_A is above the threshold THRESH_P (and thus indicating an SOS insertion rate in excess of that required to adequately compensate for clock rate mismatches) the SOS controller 114 configures the adjust signal ΔSOS_A so as to direct the packet control module 218 to increase the SOS insertion rate. The increase or decrease in the SOS insertion rate can be performed in fixed, equal increments (e.g., a 5% increase or decrease with each adjustment).

As another example, rather than an incremental adjustment to the SOS insertion rate or the calculation of the SOS insertion rate using look-up tables or based on a direct calculation, the SOS controller 114 instead can employ one of two preset skip order insertion rates. In one approach, a threshold can be set as the dividing line between, for example, a scenario whereby the transmit side and receive side are using separate SSC domains (and thus have a clock synchronization accuracy of +300/−5300 ppm under the PCIe specification) and a scenario whereby the transmit side and the receive side are in the same clock domain (and thus have a clock synchronization accuracy of +/−300 ppm under the PCIe specification). In the event that the magnitude of the clock frequency mismatch $\Delta F\_A$ is greater than this threshold, the SOS controller 114 concludes that the transmit side and receive side are in different SSC domains and thus configures the adjust signal $\Delta SOS\_A$ so as to direct the packet control module 218 to set the skip ordered set insertion rate to the higher of the two preset rates (e.g., to a worst-case rate). Conversely, in the event that the magnitude of the clock frequency mismatch $\Delta F\_A$ is not greater than this threshold, the SOS controller 114 concludes that the transmit side and receive side are in the same clock domain (or are not SSC clock domains) and thus configures the adjust signal $\Delta SOS\_A$ so as to direct the packet control module 218 to set the skip ordered set insertion rate to the lower of the two preset rates (e.g., to anon-SSC rate).

In some embodiments, at least some of the functionality described above with respect to the SOS controllers 114 and 124 may be implemented by one or more processors executing one or more software programs tangibly stored at a computer readable medium, and whereby the one or more software programs comprise instructions that, when executed, manipulate the one or more processors to perform one or more functions of the SOS controllers described above. Further, in some embodiments, interconnect interfaces described above are implemented with one or more integrated circuit (IC) devices (also referred to as integrated circuit chips). Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but are not limited to, optical media (e.g., compact disc (CD), digital versatile disc (DVD), or Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 7:
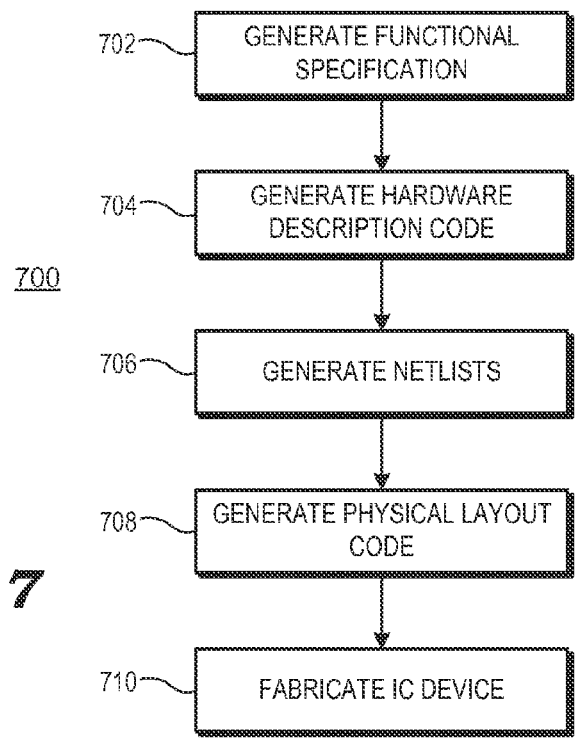
FIG. 7 is a flow diagram illustrating a method for designing and fabricating an integrated circuit device implementing at least a portion of an interconnect interface in accordance with some embodiments.

FIG. 7 is a flow diagram illustrating an example method 700 for the design and fabrication of an IC device implementing the techniques described herein. As noted above, the code generated for each of the following processes is stored or otherwise embodied in computer readable storage media for access and use by the corresponding design tool or fabrication tool.

At block 702 a functional specification for the IC device is generated. The functional specification (Often referred to as a micro architecture specification (MAS)) may be represented by any of a variety of programming languages or modeling languages, including C, C++, SystemC, Simulink™, or MAT-LAB™.

At block 704, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, System-Verilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 706 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, or in addition to synthesis, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 708, one or more EDA tools use the netlists produced at block 706 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System (GDSII) format. Data in this format typically represents geometric shapes, text labels, and other information about the circuit layout in hierarchical form.

At block 710, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

In accordance with one aspect of the present disclosure, a method of operating a system comprising a first device and a second device coupled via an interconnect comprises adjusting a rate of insertion of clock mismatch compensation symbols into a data stream transmitted by the first device via the interconnect responsive to a frequency mismatch between a first clock signal used by the first device and a second clock signal used by the second device. In one embodiment, the method further includes recovering a third clock signal from a second data stream received by the first device from the second device via the interconnect, the third clock signal representative of the second clock signal, and determining the frequency mismatch based on a phase difference between the first clock signal and the third clock signal. Determining the frequency mismatch based on the phase difference comprises specifying a phase window representing a phase difference range, and determining the frequency mismatch based on at least one of a duration between when the phase difference shifts into the phase window and when the phase difference subsequently shifts out of the phase window; a duration between when the phase difference shifts into the phase window a first time and when the phase difference subsequently shifts into the phase window a second time; and a duration between when the phase difference shifts out of the phase window a first time and when the phase difference subsequently shifts out of the phase window a second time. In one embodiment, the clock mismatch compensation symbols comprise skip ordered sets. In one embodiment, the method further includes frequency spreading a local clock signal at the device to generate a spread spectrum clock signal, wherein the first clock signal is based on the spread spectrum clock signal.

In one embodiment, determining the frequency mismatch based on a rate of change of a fullness of an elastic buffer of a receiver interface of the first device. In one embodiment, adjusting the rate of insertion of clock mismatch compensation symbols comprises increasing the rate of insertion of clock mismatch compensation symbols responsive to the frequency mismatch being greater than a threshold. IN one embodiment, adjusting the rate of insertion of clock mismatch compensation symbols comprises decreasing the rate of insertion of clock mismatch compensation symbols responsive to the frequency mismatch being less than a threshold.

In one embodiment, adjusting the rate of insertion of clock mismatch compensation symbols comprises setting the rate of insertion of clock mismatch compensation symbols to a first predefined rate responsive to the frequency mismatch being greater than a threshold and setting the rate of insertion of clock mismatch compensation symbols to a second predefined rate responsive to the frequency mismatch being not greater than the threshold, the second predefined rate less than the first predefined rate.

A method of operating a system comprising a first device and a second device coupled via an interconnect comprises adjusting a rate of insertion of clock mismatch compensation symbols into a first data stream transmitted by a bus interface of the first device responsive to determining, at the first device, whether a bus interface of the second device is operating using spread spectrum clocking. The method further can include adjusting a rate of insertion of clock mismatch compensation symbols into a second data stream transmitted by the bus interface of the second device responsive to determining, at the second device, whether the bus interface of the first device is operating using spread spectrum clocking. In one embodiment, adjusting the rate of insertion of clock mismatch compensation symbols comprises setting the rate of insertion of clock mismatch compensation symbols to a first predefined rate responsive to determining the bus interface of the second device is operating using spread spectrum clocking, and setting the rate of insertion of clock mismatch compensation symbols to a second predefined rate responsive to determining the bus interface of the second device is not operating using spread spectrum clocking.

In one embodiment, adjusting the rate of insertion of clock mismatch compensation symbols comprises increasing the rate of insertion of clock mismatch compensation symbols responsive determining one of the bus interface of the first device or the bus interface of the second device is using spread spectrum clocking and the other bus interface is not using spread spectrum clocking. In one embodiment, adjusting the rate of insertion of clock mismatch compensation symbols comprises decreasing the rate of insertion of clock mismatch compensation symbols responsive to determining at least one of: both the bus interface of the first device and the bus interface of the second device are using spread spectrum clocking, and both the bus interface of the first device and the bus interface of the second device are not using spread spectrum clocking. In one embodiment, the method further includes recovering, at the bus interface of the first device, a clock signal from a second data stream received from the second device via the interconnect, and determining, at the first device, whether the second device is using spread spectrum clocking based on a comparison of the recovered clock signal and a local clock signal used by the bus interface of the first device.

In accordance with another aspect of the present disclosure, a device comprises on bus interface comprising a transmitter interface and a receiver interface, and a clock mismatch compensation symbol controller to adjust a rate of insertion of clock mismatch compensation symbols by the transmitter interface into a data stream transmitted by the transmitter interface responsive to a frequency mismatch between a first clock signal used by the transmitter interface and a second clock signal associated with a data stream received by the receiver interface. In one embodiment, the bus interface is to recover the second clock signal from clock signal information embedded in the data stream received by the receiver interface. In one embodiment, the device further includes a frequency mismatch calculation module to determine the frequency mismatch based on a phase difference between the first clock signal and the second clock signal. The device further can include an elastic buffer to store data of the data stream received by the receiver interface using the second clock signal and to output data using the first clock signal, and a frequency mismatch calculation module to determine the frequency mismatch based on a rate of change of a fullness of the elastic buffer.

In one embodiment, the clock mismatch compensation symbol controller is to adjust the rate of insertion of clock mismatch compensation symbols by increasing the rate of insertion of clock mismatch compensation symbols responsive to the frequency mismatch being greater than a first threshold, and decreasing the rate of insertion of clock mismatch compensation symbols responsive to the frequency mismatch being less than a second threshold.

In one embodiment, the clock mismatch compensation symbol controller is to adjust the rate of insertion of clock mismatch compensation symbols by setting the rate of insertion of clock mismatch compensation symbols to a first predefined rate responsive to the frequency mismatch being greater than a threshold, and setting the rate of insertion of clock mismatch compensation symbols to a second predefined rate responsive to the frequency mismatch being not greater than the threshold, the second predefined rate less than the first predefined rate.

In one embodiment, the bus interface is compliant with at least one of: a Peripheral Component Interconnect Express (PCIe) specification; a Universal Serial Bus (USB) specification; a DisplayPort specification; a serial ATA specification, an Infiniband specification; and a Thunderbolt specification.

In accordance with yet another aspect of the present disclosure, a system includes an interconnect, a first device comprising a first bus interface coupled to the interconnect, and a second device comprising a second bus interface coupled to the interconnect. The first device is to adjust a rate of insertion of clock mismatch compensation symbols into a first data stream transmitted by the first bus interface responsive to determining whether the second bus interface is operating using spread spectrum clocking. In one embodiment, the second device is to adjust a rate of insertion of clock mismatch compensation symbols into a second data stream transmitted by the second bus interface responsive to determining whether the first bus interface is operating using spread spectrum clocking.

In one embodiment, the first device is to adjust the rate of insertion of clock mismatch compensation symbols by setting the rate of insertion of clock mismatch compensation symbols to a first predefined rate responsive to determining the second bus interface is operating using spread spectrum clocking, and setting the rate of insertion of clock mismatch compensation symbols to a second predefined rate responsive to determining the second bus interface is not operating using spread spectrum clocking. In one embodiment, the first device is to adjust the rate of insertion of clock mismatch compensation symbols by increasing the rate of insertion of clock mismatch compensation symbols responsive to determining one of the first and second bus interfaces is using spread spectrum clocking and the other bus interface is not using spread spectrum clocking and by decreasing the rate of insertion of clock mismatch compensation symbols responsive to determining at least one of: both the first bus interface and the second bus interface are using spread spectrum clocking; and both the first bus interface and the second bus interface are not using spread spectrum clocking.

In one embodiment, the first bus interface further comprises a clock recovery module to recover a first clock signal from a second data stream received from the second device via the interconnect, the first clock signal aligned to a clock signal used by the second bus interface, and the first device is to determine whether the second device is using spread spectrum clocking based on a comparison of the first clock signal and a second clock signal used by the first bus interface.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any features that may cause any benefit, advantage, or solution to occur or become more pronounced are not to be construed as a critical, required, or essential feature of any or all the claims.

What is claimed is:

1. A method of operating a system comprising a first device and a second device coupled via an interconnect, the method comprising:
   adjusting a rate of insertion of clock mismatch compensation symbols into a data stream transmitted by the first device via the interconnect responsive to a frequency mismatch between a first clock signal used by the first device and a second clock signal used by the second device; and
   wherein adjusting the rate of insertion of clock mismatch compensation symbols comprises:
      setting the rate of insertion of clock mismatch compensation symbols to a first predefined rate responsive to the frequency mismatch being greater than a threshold; and
      setting the rate of insertion of clock mismatch compensation symbols to a second predefined rate responsive to the frequency mismatch being not greater than the threshold, the second predefined rate less than the first predefined rate.

2. The method of claim 1, further comprising:
   determining the frequency mismatch based on a rate of change of a fullness of an elastic buffer of a receiver interface of the first device.

3. The method of claim 1, further comprising:
   frequency spreading a local clock signal at the device to generate a spread spectrum clock signal, wherein the first clock signal is based on the spread spectrum clock signal.

4. The method of claim 1, wherein the clock mismatch compensation symbols comprise skip ordered sets.

5. A method of operating a system comprising a first device and a second device coupled via an interconnect, the method comprising:
   adjusting a rate of insertion of clock mismatch compensation symbols into a data stream transmitted by the first device via the interconnect responsive to a frequency mismatch between a first clock signal used by the first device and a second clock signal used by the second device;

recovering a third clock signal from a second data stream received by the first device from the second device via the interconnect, the third clock signal representative of the second clock signal;

determining the frequency mismatch based on a phase difference between the first clock signal and the third clock signal by:

specifying one or more phase windows representing corresponding phase difference ranges; and determining the frequency mismatch based on at least one of: a duration between when the phase difference shifts into a phase window and when the phase difference subsequently shifts out of the same phase window; a duration between when the phase difference shifts into a phase window a first time and when the phase difference subsequently shifts into the same phase window a second time; a duration between when the phase difference shifts out of a phase window a first time and when the phase difference subsequently shifts out of the same phase window a second time; a duration between when the phase difference shifts into a first phase window and when the phase difference subsequently shifts into a second phase window; and a duration between when the phase difference shifts out of a first phase window and when the phase difference subsequently shifts out of a second phase window.

6. The method of claim 5, wherein adjusting the rate of insertion of clock mismatch compensation symbols comprises increasing the rate of insertion of clock mismatch compensation symbols responsive to the frequency mismatch being greater than a threshold.

7. The method of claim 5, wherein adjusting the rate of insertion of clock mismatch compensation symbols comprises decreasing the rate of insertion of clock mismatch compensation symbols responsive to the frequency mismatch being less than a threshold.

8. A method of operating a system comprising a first device and a second device coupled via an interconnect, the method comprising:

adjusting a rate of insertion of clock mismatch compensation symbols into a first data stream transmitted by an interconnect interface of the first device responsive to determining, at the first device, whether an interconnect interface of the second device is operating using spread spectrum clocking, wherein adjusting the rate of insertion of clock mismatch compensation symbols comprises:

setting the rate of insertion of clock mismatch compensation symbols to a first predefined rate responsive to determining the interconnect interface of the second device is operating using spread spectrum clocking; and setting the rate of insertion of clock mismatch compensation symbols to a second predefined rate responsive to determining the interconnect interface of the second device is not operating using spread spectrum clocking.

9. The method of claim 8, further comprising:

adjusting a rate of insertion of clock mismatch compensation symbols into a second data stream transmitted by the interconnect interface of the second device responsive to determining, at the second device, whether the interconnect interface of the first device is operating using spread spectrum clocking.

10. The method of claim 8, further comprising:

recovering, at the interconnect interface of the first device, a clock signal from a second data stream received from the second device via the interconnect; and determining, at the first device, whether the second device is using spread spectrum clocking based on a comparison of the recovered clock signal and a local clock signal used by the interconnect interface of the first device.

11. A device comprising:

an interconnect interface comprising a transmitter interface and a receiver interface; and a clock mismatch compensation symbol controller to adjust a rate of insertion of clock mismatch compensation symbols by the transmitter interface into a data stream transmitted by the transmitter interface responsive to a frequency mismatch between a first clock signal used by the transmitter interface and a second clock signal associated with a data stream received by the receiver interface;

wherein the clock mismatch compensation symbol controller is to adjust the rate of insertion of clock mismatch compensation symbols by:

setting the rate of insertion of clock mismatch compensation symbols to a first predefined rate responsive to the frequency mismatch being greater than a threshold; and setting the rate of insertion of clock mismatch compensation symbols to a second predefined rate responsive to the frequency mismatch being not greater than the threshold, the second predefined rate less than the first predefined rate.

12. The device of claim 11, wherein the interconnect interface is to recover the second clock signal from clock signal information embedded in the data stream received by the receiver interface.

13. The device of claim 11, further comprising:

a frequency mismatch calculation module to determine the frequency mismatch based on a phase difference between the first clock signal and the second clock signal.

14. The device of claim 11, further comprising:

an elastic buffer to store data of the data stream received by the receiver interface using the second clock signal and to output data using the first clock signal; and a frequency mismatch calculation module to determine the frequency mismatch based on a rate of change of a fullness of the elastic buffer.

15. The device of claim 11, wherein the clock mismatch compensation symbols comprise skip ordered sets.

16. The device of claim 11, wherein the interconnect interface is compliant with at least one of: a Peripheral Component Interconnect Express (PCIe) specification; a Universal Serial Bus (USB) specification; a DisplayPort specification; a serial ATA specification, an Infiniband specification; and a Thunderbolt specification.

17. A system comprising:

an interconnect;

a first device comprising a first interconnect interface coupled to the interconnect; and a second device comprising a second interconnect interface coupled to the interconnect; and wherein the first device is to adjust a rate of insertion of clock mismatch compensation symbols into a first data stream transmitted by the first interconnect interface responsive to determining whether the second interconnect interface is operating using spread spectrum clocking, wherein the first device is to adjust the rate of insertion of clock mismatch compensation symbols by:
   setting the rate of insertion of clock mismatch compensation symbols to a first predefined rate responsive to determining the second interconnect interface is operating using spread spectrum docking; and
   setting the rate of insertion of clock mismatch compensation symbols to a second predefined rate responsive to determining the second interconnect interface is not operating using spread spectrum clocking.

18. The system of claim 17, wherein:
the second device is to adjust a rate of insertion of clock mismatch compensation symbols into a second data stream transmitted by the second interconnect interface responsive to determining whether the first interconnect interface is operating using spread spectrum clocking.

19. The system of claim 17, wherein:
the first interconnect interface further comprises a clock recovery module to either recover a first clock signal from a second data stream received from the second device via the interconnect or receive the first clock signal via an interconnect between the first interconnect interface and the second interconnect interface, the first clock signal having a frequency substantially equal to a frequency of a clock signal used by the second interconnect interface; and
the first device is to determine whether the second device is using spread spectrum clocking based on a comparison of the first clock signal and a second clock signal used by the first interconnect interface.

* * * * *